Sept. 9, 1952   J. B. DICKSON   2,609,611
APPARATUS FOR ADJUSTING VEHICLE HEADLAMPS
Filed April 13, 1950
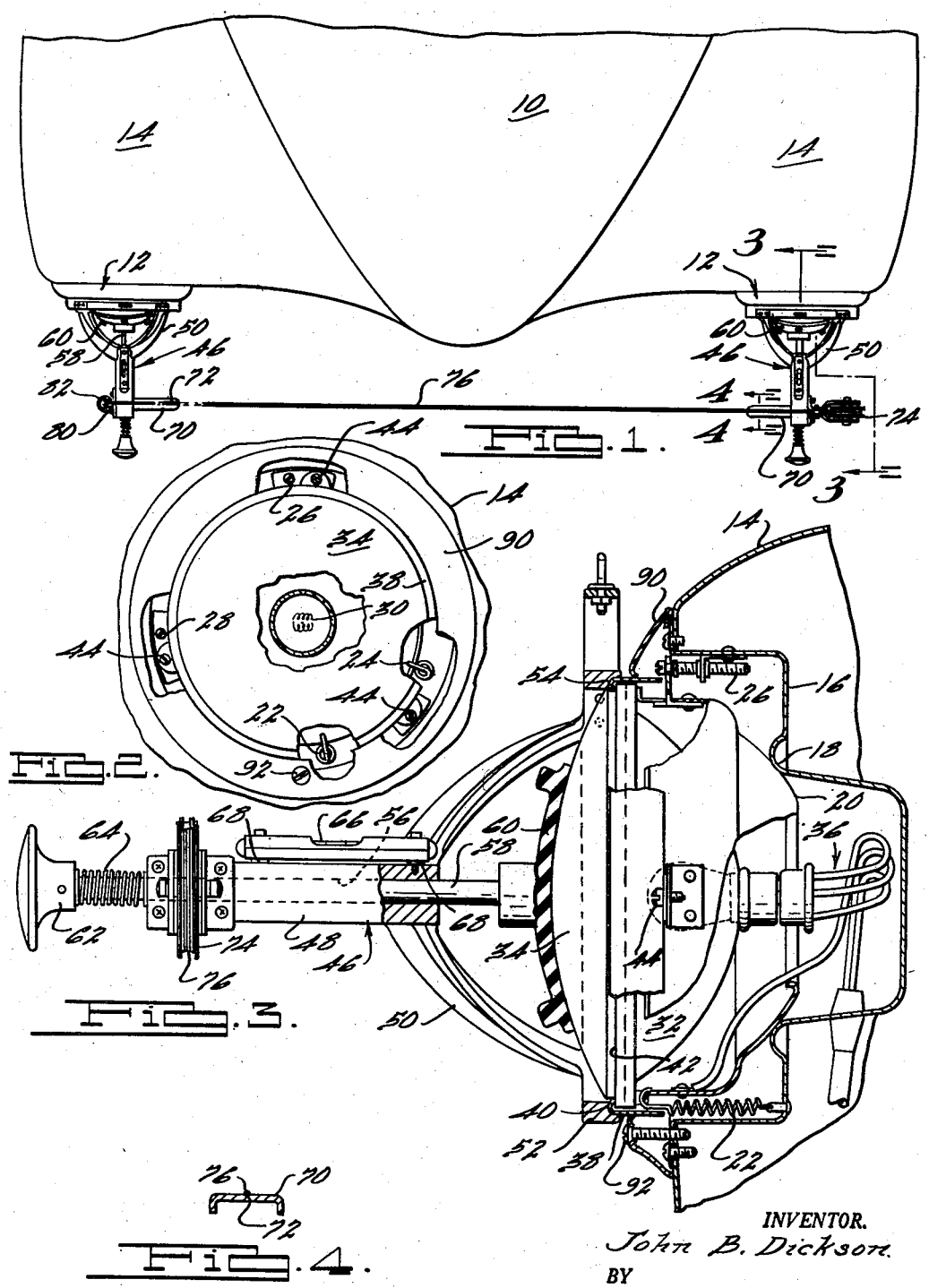
INVENTOR.
John B. Dickson.
BY
Harness and Harris
ATTORNEYS.

Patented Sept. 9, 1952

2,609,611

UNITED STATES PATENT OFFICE 2,609,611

APPARATUS FOR ADJUSTING VEHICLE HEADLAMPS

John B. Dickson, Highland Park, Mich., assignor to Chrysler Corporation, Highland Park, Mich., a corporation of Delaware Application April 13, 1950, Serial No. 155,685

8 Claims. (Cl. 33—180)

This invention relates to apparatus for determining the proper adjustment of a pair of vehicle headlamps. The apparatus is particularly adapted for use with headlamps of the type having a sealed unit including a source of light, a reflector and a lens mounted for universal movement in a stationary housing carried by the vehicle.

It is a principal object of the invention to provide an apparatus for adjusting the headlamps which may be applied to the headlamps without removing the sealed unit thereof from the vehicle.

It is a further object of the invention to provide adjusting apparatus which does not necessitate the use of a beam of light to determine the proper adjustment thereby facilitating adjustment even under daylight conditions.

Conventional headlamps of the type having a sealed unit are usually provided with a retaining ring for holding the unit in a lamp housing and it is an additional object of the invention to provide headlamp adjusting apparatus which is adapted to seat directly upon the retaining ring for guiding the adjustment of the lamp.

It is a further object of the invention to provide headlamp adjusting apparatus adapted to adhere to the headlamp by reason of the engagement of a vacuum cup with the headlamp lens.

In the drawings:

Fig. 1 is a plan view of a portion of a motor vehicle showing a pair of headlamp adjusting devices secured thereto in their operative position;

Fig. 2 is a front elevation of a conventional headlamp with the trim moulding removed;

Fig. 3 is a vertical section taken on the line 3—3 of Fig. 1; and

Fig. 4 is a section on the line 4—4 of Fig. 1.

In Fig. 1 an automobile 10 is illustrated as provided with a pair of headlamps 12. The construction of the headlamps is conventional and is illustrated in more detail in Figs. 2 and 3. An automotive body panel 14 is provided with a lamp housing 16 which has formed therein an annular seat 18 adapted to cooperate with a bowl shaped holder 20. The holder 20 is mounted for universal movement upon the annular seat 18. The holder 20 is retained within housing 16 by means of a spaced pair of springs 22 and 24 and a pair of adjusting screws 26 and 28. Adjustment of screw 26 moves the top of the bowl shaped holder 20 inwardly or outwardly and spring 22 accommodates this movement while adjustment of screw 28 rotates the holder 20 about the vertical axis and the spring 24 accommodates this movement.

A conventional sealed unit is provided which includes a source of light or filament 30, a reflector 32 and a lens 34 which are assembled as a unit and connected by wires 36 to an electrical circuit in the conventional manner. The sealed unit is retained within the holder 20 by means of a retaining ring 38 which has a flange 40 adapted to engage a flange 42 of the sealed unit. The retaining ring 38 is secured to the bowl shaped holder 20 by means of a plurality of screws 44 so that the sealed unit including filament 30, reflector 32 and lens 34 moves as a unit with the holder 20 in response to universal movement and adjustment of the latter.

The headlamp adjusting apparatus includes a pair of devices 46 adapted to be temporarily assembled with each of the headlamps respectively. One of the devices is illustrated in Fig. 3 and each device includes a frame 48 having a plurality of leg portions 50 connecting the frame 48 with a ring 52 which is provided with a surface 54 shaped to engage the retaining ring 38. The frame 48 is provided with an opening 56 in which a rod 58 is slidably mounted. The rod 58 carries a vacuum cup 60 formed of rubber like material and adapted to adhere by vacuum to the outer surface of the lens 34. A conventional handle 62 is provided on the end of rod 58 remote from the vacuum cup 60 and a spring 64 reacts between the handle 62 and the frame 48 to urge the frame 48 into contact with the retaining ring 38 when the vacuum cup 60 adheres to the lens 34. Each of the devices 46 is provided with a spirit level 66 which is mounted upon the frame 48 and may be adjusted by shims 68 so that when the spirit level is horizontal the frame 48 and ring 52 will be inclined a predetermined amount to give the desired deflection to the headlamp beam. Thus, in adjusting the headlamps the screw 26 may be turned until the holder 20 assumes a position in which the spirit level becomes horizontal. This assures that at this position the headlamp is deflected the proper amount.

In adjusting vehicle headlamps it is also necessary to determine when the headlamp beams are parallel to the axis of the vehicle. To this end each frame 48 is provided with an arm 70 having a groove 72 therein which is parallel to the plane of the surface 54 of ring 52. The arms 70 are each directed toward each other and one of the devices 46 is provided with a reel 74 which is rotatably mounted thereon and carries a length of cord 76. The cord 76 may be extended across the front of the vehicle as illustrated in Fig. 1 and secured to the other device 46 at a corresponding point on its frame 48. A bifurcated lug 80 is preferably provided on the last mentioned device to receive the cord 76 at the proper location and a button 82 may be provided on the cord to hold the cord in its extended position by engagement with the lug 80. It will be seen that when the cord 76 is aligned with the grooves 72 in each of the arms 70 that the surfaces 54 of the rings 52 will be parallel and therefore the retaining rings 38 of each of the headlamps will be aligned about vertical axes. This assures that the headlamps are then directed straight ahead of the vehicle in parallel beams and the adjustment of the lamp about a horizontal axis and a vertical axis completes the required adjustment.

Attention is invited to the fact that the above adjustments have been performed without the necessity of turning on the headlamps or removing the sealed units from the vehicle. A trim moulding of conventional design is indicated in Fig. 3 by the numeral 90 and it is to be understood that this moulding must be removed by removal of a screw 92 to permit access to the screws 26 and 28 in the manner described above.

I claim:

1. Apparatus for determining the proper adjustment of a pair of vehicle headlamps provided with a lens and a retaining ring, said apparatus comprising a pair of devices each having a frame provided with a surface adapted to be seated on said retaining rings, a vacuum cup carried by each of said frames and adapted to adhere to the lens of one of said headlamps to hold its respective device in assembled relationship with said headlamp, with said surface seated on the retaining ring thereof, means on each of said devices to indicate when the axis of its associated headlamp is inclined a predetermined amount to the horizontal and means to indicate when the axes of said headlamps are aligned with the longitudinal axis of the vehicle.

2. Apparatus for determining the proper adjustment of a pair of vehicle headlamps of the type having a sealed unit including a source of light, a reflector and a lens mounted for universal movement in a stationary housing and provided with a retaining ring adapted to engage a portion of said unit and having manually adjustable means for adjusting the position of said ring to retain said unit in a selected position in said housing; said apparatus comprising a pair of devices each having a frame provided with a surface adapted to be seated on the retaining ring of one of said headlamps, a vacuum cup carried by each of said frames, each of said vacuum cups being adapted to adhere to the lens of one of said headlamps to temporarily retain each of said devices in assembled relation with one of said headlamps with said surface seated on the retaining ring thereof, a level mounted on each of said frames at a predetermined angle to said surface so that when said level is horizontal said surface and said ring are in a predetermined generally vertical plane, means to extend a straight line from one of said devices to the other and indicating means carried by each of said devices to show when the axes of said units are normal to said line.

3. Apparatus for determining the proper adjustment of a pair of vehicle headlamps of the type having a sealed unit including a source of light, a reflector and a lens mounted for universal movement in a stationary housing and provided with a retaining ring adapted to engage a portion of said unit and having manually adjustable means for adjusting the position of said ring to retain said unit in a selected position in said housing; said apparatus comprising a pair of devices each provided with a frame having a surface adapted to engage the retaining ring of one of said headlamps, an element carried by each of said frames and mounted for movement relative thereto, a vacuum cup carried by each movable element and adapted to adhere to the lens of one of said lamps, spring means reacting between each of said elements and each of said frames to urge said surfaces into engagement with the retaining rings of the associated headlamps, means on each of said devices to indicate when the axis of its associated headlamp is inclined a predetermined amount to the horizontal and means to indicate when the axes of said headlamps are aligned with the longitudinal axis of the vehicle.

4. Apparatus for determining the proper adjustment of a pair of vehicle headlamps of the type having a sealed unit including a source of light, a reflector and a lens mounted for universal movement in a stationary housing and provided with a retaining ring adapted to engage a portion of said unit and having manually adjustable means for adjusting the position of said ring to retain said unit in a selected position in said housing; said apparatus comprising a pair of devices each provided with a frame having a surface adapted to engage the retaining ring of one of said headlamps, an element carried by each of said frames and mounted for movement relative thereto, a vacuum cup carried by each movable element and adapted to adhere to the lens of one of said lamps, spring means reacting between each of said elements and each of said frames to urge said surfaces into engagement with the retaining rings of the associated headlamps, a spirit level mounted on each of said frames, means to adjust the inclination of each of said levels relative to its associated frame so that when said spirit levels are horizontal a predetermined inclination of said frames and the axes of said headlamps will be obtained and means to indicate when the axes of said headlamps are aligned with the longitudinal axis of the vehicle.

5. Apparatus for determining the proper adjustment of a pair of vehicle headlamps of the type having a sealed unit including a source of light, a reflector and a lens mounted for universal movement in a stationary housing and provided with a retaining ring adapted to engage a portion of said unit and having manually adjustable means for adjusting the position of said ring to retain said unit in a selected position in said housing; said apparatus comprising a pair of devices each provided with a frame having a surface adapted to engage the retaining ring of one of said headlamps, a rod slidably mounted in each of said frames for linear movement in a direction generally normal to said surface of the associated frame, a vacuum cup on each of said rods adapted to engage the lens of one of said headlamps in response to linear movement of the rod, spring means reacting between each of said rods and its associated frame to urge said surface of the associated frame into contact with one of said retaining rings when the vacuum cup on the associated rod is in engagement with the lens of one of said headlamps, a level mounted on each of said devices at a predetermined angle to said surface so that when said level is horizontal said surface and said ring are in a predetermined generally vertical plane, means to extend a straight line from one of said devices to the other and indicating means carried by each of said devices to show when the axes of said units are normal to said line.

6. Apparatus for determining the proper adjustment of a pair of vehicle headlamps of the type having a sealed unit including a source of light, a reflector and a lens mounted for universal movement in a stationary housing and provided with a retaining ring adapted to engage a portion of said unit and having manually adjustable means for adjusting the position of said ring to retain said unit in a selected position in said housing; said apparatus comprising a pair of devices each provided with a frame having a surface adapted to engage the retaining ring of one of said headlamps, a movable element carried by each of said frames, a vacuum cup carried by each movable element and adapted to adhere to the lens of one of said lamps in response to manual movement of said elements to hold each of said devices in assembled relation with one of said headlamps, means on each of said frames to indicate when the axis of its associated headlamp is inclined a predetermined amount to the horizontal, a reel carried by one of said frames, a cord associated with said reel and adapted to be extended to the other of said frames and indicating means associated with each of said frames and adapted to visually indicate when said cord is perpendicular to the axis of each of said headlamps.

7. A pair of devices for determining the proper adjustment of a pair of vehicle headlamps, each device comprising a frame having an arcuate headlamp engaging surface, a rod mounted for linear movement relative to said frame, a vacuum cup carried on one end of said rod and adapted to adhere to a headlamp lens, spring means reacting between said rod and said frame to urge said frame against one of said vehicle headlamps when said cup is adhered to the headlamp lens, and indicating means carried by each of said frames to indicate the position of the device relative to a horizontal plane, said pair of devices including means to extend a straight line from one of said devices to the other and indicating means carried by each of said devices to show when the axes of said headlamps are normal to said line.

8. A device for determining the proper adjustment of a vehicle headlamp comprising a frame having an arcuate headlamp engaging surface, a rod mounted for linear movement relative to said frame, a vacuum cup carried on one end of said rod and adapted to adhere to a headlamp lens, spring means reacting between said rod and said frame to urge said frame against said headlamp when said cup is adhered to the headlamp lens, a spirit level mounted on said frame and means to adjust the inclination of said level relative to said frame so that when said spirit level is horizontal a predetermined inclination of said frame will be obtained.

JOHN B. DICKSON.

REFERENCES CITED

The following references are of record in the file of this patent:

UNITED STATES PATENTS

| Number | Name | Date |
|---|---|---|
| 1,707,593 | Arbuckle | Apr. 2, 1929 |
| 1,847,652 | Jenkins | Mar. 1, 1932 |
| 2,497,481 | Weber | Feb. 14, 1950 |